US011518490B2

(12) United States Patent
Schroeder et al.

(10) Patent No.: US 11,518,490 B2
(45) Date of Patent: Dec. 6, 2022

(54) FUSELAGE ASSEMBLY FOR AN AIRCRAFT

(71) Applicants: Airbus Operations GmbH, Hamburg (DE); Airbus SAS, Blagnac (FR)

(72) Inventors: Matthias S. Schroeder, Bristol (GB); Jesus Miguel Batanero Benito, Bristol (GB); Srivats Srinivasan, Bristol (GB); Avinash Kumar Yadav, Bristol (GB); Vinayak Ramachandra Patil, Bristol (GB); Abhishek Vyas, Bristol (GB)

(73) Assignees: Airbus Operations GmbH, Hamburg (DE); Airbus SAS, Blagnac (FR)

( * ) Notice: Subject to any disclaimer, the term of this patent is extended or adjusted under 35 U.S.C. 154(b) by 48 days.

(21) Appl. No.: 17/119,260

(22) Filed: Dec. 11, 2020

(65) Prior Publication Data
US 2021/0094669 A1 Apr. 1, 2021

Related U.S. Application Data

(63) Continuation of application No. 16/365,021, filed on Mar. 26, 2019, now Pat. No. 10,875,619.

(30) Foreign Application Priority Data

Mar. 28, 2018 (IN) .............................. 201841011605

(51) Int. Cl.
*B64C 1/06* (2006.01)
*B64C 1/08* (2006.01)
*B64C 1/12* (2006.01)
*B64C 1/40* (2006.01)
*B64D 13/06* (2006.01)

(52) U.S. Cl.
CPC .............. *B64C 1/064* (2013.01); *B64C 1/061* (2013.01); *B64C 1/08* (2013.01); *B64C 1/12* (2013.01); *B64C 1/40* (2013.01); *B64D 13/06* (2013.01); *B64D 2013/0618* (2013.01); *B64D 2013/0625* (2013.01)

(58) Field of Classification Search
CPC ........... B64C 1/064; B64C 1/061; B64C 1/08; B64C 1/12; B64C 1/40; B64D 13/06; B64D 2013/0618; B64D 2013/0625
See application file for complete search history.

(56) References Cited

U.S. PATENT DOCUMENTS

| 2,755,638 A | 7/1956 | Sevin |
| 5,479,983 A | 1/1996 | Fischer et al. |
| 5,897,079 A | 4/1999 | Specht et al. |

(Continued)

FOREIGN PATENT DOCUMENTS

| EP | 2 256 031 | 12/2010 |
| EP | 2 979 975 | 2/2016 |
| WO | 2011/016931 | 2/2011 |

OTHER PUBLICATIONS

European Search Report cited in EP 19164097.8 dated Aug. 14, 2019, 10 pages.

(Continued)

*Primary Examiner* — Justin M Benedik
(74) *Attorney, Agent, or Firm* — Nixon & Vanderhye P.C.

(57) ABSTRACT

A fuselage assembly for an aircraft including a stringer extending longitudinally along the fuselage. The stringer defines a fluid channel. The fluid channel is configured to form at least part of a distribution duct of a cabin air distribution system.

19 Claims, 4 Drawing Sheets

(56) References Cited

U.S. PATENT DOCUMENTS

| | | |
|---|---|---|
| 6,491,254 B1 | 12/2002 | Walkinshaw et al. |
| 2010/0148003 A1 | 6/2010 | Verweyen |
| 2012/0074258 A1 | 3/2012 | Papke et al. |
| 2012/0248244 A1 | 10/2012 | Brownjohn et al. |
| 2013/0164465 A1 | 6/2013 | Lacombe et al. |
| 2013/0187001 A1 | 7/2013 | Gensch et al. |
| 2013/0316147 A1 | 11/2013 | Douglas et al. |
| 2016/0031562 A1 | 2/2016 | Mores et al. |
| 2018/0370610 A1* | 12/2018 | Sankrithi ............... B64D 11/06 |

OTHER PUBLICATIONS

Combined Search and Examination Report for GB1808449.1, dated Nov. 22, 2018, 6 pages.
Examination Report for GB1808449.1, dated Feb. 5, 2019, 4 pages.
Search Report for GB1808449.1, dated Feb. 5, 2019, 2 pages.

* cited by examiner

FUSELAGE ASSEMBLY FOR AN AIRCRAFT

RELATED APPLICATION

This application is a continuation of application Ser. No. 16/365,021, filed Mar. 26, 2019, which claims priority to Indian Patent application 201841011605, filed Mar. 28, 2018, the entirety of these applications are incorporated by reference.

FIELD OF THE INVENTION

The present invention relates to a fuselage assembly for an aircraft. The present invention also relates to a cabin air distribution system, a frame for an aircraft fuselage, and an aircraft.

BACKGROUND OF THE INVENTION

The fuselage of an aircraft typically has a pressurised cabin. A cabin environmental control system, also known as aircraft air-conditioning, is used to circulate airflow to the cabin. The cabin environmental control system typically takes air from one or a variety of sources, for example bleed air from an engine, recirculated air from the cabin, and atmospheric ram air which is subsequently mixed by a mixer unit and supplied to the cabin by a cabin air distribution system. A plurality of ducts are provided to supply the air from the mixer unit to the cabin.

The cabin air distribution system typically comprises a longitudinally extending distribution duct in a crown region of the fuselage with a fishbone configuration of outlet ducts extending perpendicularly from the distribution duct to each side of the fuselage to air vents in the cabin. Riser ducts supply the air from the mixer unit to the distribution duct, with the riser ducts being disposed in frame bays between adjacent frames of the fuselage structure. Such a cabin air distribution system therefore requires a substantive number of ducts in a complicated arrangement. The ducts take up a substantive volume in the fuselage, and so may contribute to a significant reduction in the volume of the cabin, or the space available for other systems within the fuselage.

The ducts also require insulation to maintain the air flowing through the ducts within a desired temperature range. The provision of the ducting also requires a substantive number of fixings such as brackets for the ducting, as well as a substantive time period for assembly of the ducting within the fuselage.

SUMMARY OF THE INVENTION

According to an aspect of the invention, there is provided a fuselage assembly for an aircraft comprising a stringer extending longitudinally along the fuselage assembly, the stringer defining a fluid channel, and wherein the fluid channel is configured to form at least part of a distribution duct of a cabin air distribution system.

With this arrangement, it is possible to provide integration of structural and air distribution architecture. As such it is possible to minimise the required space for the cabin air distribution system.

The stringer may be a first type of stringer configuration and the fuselage may further comprise a plurality of further stringers, wherein each of the plurality of further stringers is at least a second type of stringer configuration.

It is therefore possible to minimise weight by providing a stringer forming at least part of the distribution duct, and other ducts which form part of the structure of the fuselage but do not form part of the distribution duct.

The first type of stringer configuration may be a closed profile stringer configuration, and the second type of stringer configuration may be an open profile stringer configuration.

As such, the weight of the fuselage may be minimised.

The open profile stringer configuration may be at least one of a C, I, J, L and Z-shaped profile stringer.

The stringer defining the fluid channel may be an inverted hat profile stringer.

As such, it is possible to form the fluid channel in a straightforward manner, with minimal components.

The fuselage assembly may comprise a crown region, and the stringer may extend longitudinally along the crown region.

The further stringer may define a further fluid channel forming at least part of a further distribution duct of the cabin air distribution system.

The stringer defining the fluid channel and the further stringer defining the further fluid channel may extend parallel to, and spaced from, each other in the crown region.

With such an arrangement it is possible to remove the need to provide a complicated fishbone configuration in the crown region of the fuselage.

Each of the stringer defining the fluid channel and the further stringer defining the further fluid channel may comprise a plurality of fluid outlets spaced along the stringer.

As such it is possible to minimise the length of ducting required to provide air vents on either side of the cabin.

The fuselage assembly may comprise a frame, wherein the frame includes a stringer receiving opening and the stringer extends through the stringer receiving opening.

With this arrangement it is possible to maintain direct load paths along the frame and stringer.

The fuselage assembly may comprise a riser duct, wherein the riser duct may be in fluid communication with the fluid channel of the stringer.

The frame may define a frame channel and the frame channel may be configured to form at least part of the riser duct of the cabin air distribution system.

With such an arrangement, it is possible to provide integration of structural and air distribution architecture for both riser and distribution ducts with frames and stringers respectively. Therefore, the number of components and assembly time may be minimised.

The fuselage assembly may comprise a panel enclosing a side of the fluid channel of the stringer.

The fuselage assembly may comprise a fuselage skin, wherein the fuselage skin comprises the panel. As such, the distribution duct is straightforwardly formed by structural components of the fuselage.

The panel may comprise an insulation layer. As such, the temperature of the air flowing in the distribution duct may be controlled.

The panel may comprise a support layer. As such, the loading of the stringer may be increased. Therefore, the fuselage weight may be minimised.

According to another aspect of the invention, there is provided a cabin air distribution system for an aircraft fuselage, comprising a distribution duct extending longitudinally along the body, wherein a stringer of the aircraft fuselage forms at least part of the distribution duct.

The cabin air distribution system may comprise a riser duct configured to supply air to the distribution duct, wherein a frame of the aircraft fuselage forms at least part of the riser duct.

The cabin air distribution system may comprise a further distribution duct, wherein the system comprises a further stringer forming at least part of the further distribution duct.

The distribution duct may be configured to distribute air on one side of the cabin and the further distribution duct is configured to distribute air to the other side of the cabin.

As such, the efficiency of the cabin air distribution system may be maximised, and the length of ducting required may be minimised.

According to another aspect of the invention, there is provided a cabin air distribution system for an aircraft fuselage, comprising a cabin air supply, a first longitudinally extending duct with a plurality of air outlets configured to eject air at a first side of a cabin, a second longitudinally extending duct with a plurality of air outlets configured to eject air at a second side of a cabin, a first riser duct configured to supply air from the cabin air supply to the first longitudinally extending duct, and a second riser duct configured to supply air from the cabin air supply to the second longitudinally extending duct.

According to another aspect of the invention, there is provided a frame for an aircraft fuselage, the frame comprising: a fluid duct, a skin mounting section configured to mount to a skin of the aircraft fuselage, wherein the fluid duct is spaced from the skin mounting section.

With such a configuration, it is possible to restrict temperature fluctuations in the fluid flowing through the fluid duct due to variances in the external atmospheric temperature.

The arrangement helps to provide spacing for stringers to run transverse to the frame without the stringers intersecting the fluid duct. As such, it is possible to limit any effect on the load paths of the stringers and frame, and to provide an uninterrupted fluid path formed by the frame.

The frame may comprise an upper part forming the fluid duct and a lower part forming the skin mounting section, wherein the lower part may be configured to be disposed between the skin of the fuselage and the fluid duct.

The frame may comprise a panel, wherein the upper part defines a frame channel and the panel encloses an open side of the frame channel to form the fluid duct.

As such, the fluid duct may be easily formed.

The panel may be between the upper part and the lower part.

As such, the panel may help contribute to the stiffness of the frame. The weight of the frame may be minimised.

The lower part may comprise a stringer receiving opening configured to receive a stringer extending transverse to the frame, wherein the stringer receiving opening is independent from the fluid duct.

The upper part may be an inverted hat profile section. As such, the frame channel may be formed in a straightforward manner.

The lower part may comprise at least one profile section structural element.

The at least one profile section structural element may have a C, I, J, Z or hat-shaped profile.

The lower part may comprise two parallel spaced profile section structural elements, and the upper part may extend between the two parallel spaced profile section structural elements.

The or each lower part may comprises a lower part foot, a lower part web and a lower part flange.

The frame may further comprise an insulation layer extending around the fluid duct.

The fluid duct may be configured to form at least part of a cabin air distribution system.

According to another aspect of the present invention, there is provided a cabin air distribution system comprising a frame as described above.

According to another aspect of the present invention, there is provided a fuselage assembly for an aircraft comprising at least one of a frame as described above and a cabin air distribution system as described above.

An aircraft comprising at least one of a fuselage assembly as described above, a cabin air distribution system as described above, and a frame as described above.

BRIEF DESCRIPTION OF THE DRAWINGS

Embodiments of the invention will now be described with reference to the accompanying drawings, in which.

DETAILED DESCRIPTION OF EMBODIMENTS

Figure 1:
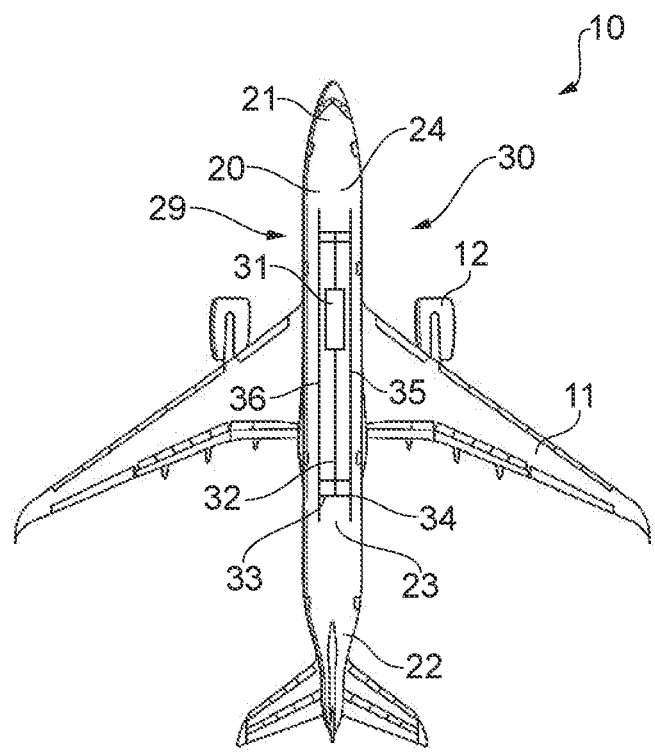
FIG. 1 is a plan view of an aircraft with a cabin air distribution system.

An aircraft 10 is shown in FIG. 1. The aircraft 10 includes wings 11 extending from a fuselage 20. It will be appreciated that the fuselage 20 and the wings 11 may take on a variety of different planform shapes and profiles depending on the particular application. Engines 12 are mounted to each wing 11. The fuselage 20 defines a longitudinal axis of the aircraft 10. The longitudinal axis extends from a forward end 21 to a rearward end 22.

In the following description, the term "front" refers to components towards the forward end 21, and the term "rear" refers to components towards the rearward end 22. The terms "forward" and "rearward" shall be construed accordingly. The position of features may be construed relative to other components and features, for example a forward component may be disposed on the forward side of another component, but towards the rearward end 22.

The fuselage 20 is generally tubular. The fuselage 20 is formed from one or more fuselage assemblies. As such, the fuselage 20 is formed from a plurality of assembly sections. The fuselage 20 defines a cabin 23. The cabin 23 is an enclosed space defined by the fuselage 20. Typically, the cabin 23 is a passenger cabin. Cargo may be carried in the cabin 23.

Figure 2:
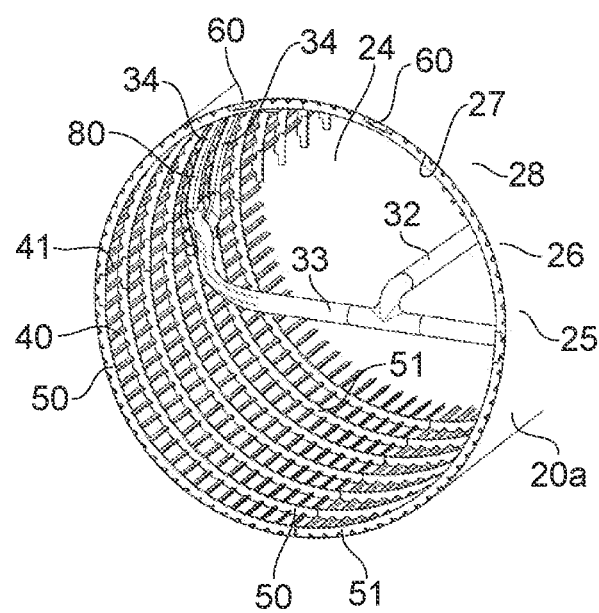
FIG. 2 is a partial cut-away perspective view of a fuselage of the aircraft of FIG. 1.

Referring to FIG. 2, the fuselage 20 is formed as a fuselage structure comprising a plurality of components. The fuselage 20 comprises a fuselage body 20a with a fuselage skin 25. The fuselage skin 25 comprises panels 26. The panels 26 are arcuate. The fuselage skin 25 has an inner side 27 and an outer side 28. The fuselage skin 25 is formed from a composite material. However, it will be understood that the material may vary, for example a metallic material.

The fuselage 20 comprises stringers 40 and frames 50. The stringers 40 and frames 50 on the fuselage skin 25 provide structural support. The stringers 40 extend in a longitudinal direction along the fuselage body 20a. The stringers 40 extend in a parallel and spaced relationship to each other. The stringers 40 are fixed, for example, by bolting or bonding to the fuselage skin 25. The stringers 40 are spaced in a hoop-wise direction. The stringers 40 are on the inner side 27 of the fuselage skin 25. The stringers 40 are elongate members.

The frames 50 extend on the inner side 27 of the fuselage skin 25. The frames 50 extend perpendicular to the longitudinal axis of the fuselage 20. The frames 50 extend in a hoop-wise arrangement. As such, the frames 50 are arcuate. The plurality of frames 50 are spaced apart from each other in a longitudinal direction. The frames 50 are fixed, for example, by bolting or bonding to the fuselage skin 25. The frames 50 extend in a parallel and spaced relationship to each other. The frames 50 are spaced in a longitudinal direction.

Openings 52 are formed through the frames 50. The openings 52 extend from the lower end of the frames 50, and are also known as "mouse holes". The arrangement of the stringers 40 and frames 50 is shown more clearly in FIGS. 5 and 6. The openings 52 are spaced apart along the length of the frames 50. The spacing of the openings 52 corresponds to the spacing of the stringers 40 on the fuselage skin 25. The stringers 40 are received through the openings 52. Frame foot portions 53 are defined between each adjacent of pair of openings 52. The frame foot portions 53 are affixed to the fuselage skin 25. The openings 52 correspond to the size, shape and arrangement of the stringers 40 extending therethrough. As such, the frames 50 extend perpendicular to the stringers 40 such that both act as structural members for the fuselage skin 25, but are not directly integrally formed with each other.

The fuselage 20, comprising a fuselage assembly, includes different types of stringer 40 configurations. The fuselage 20 comprises open profile stringers 41 and closed profile stringers 60. The closed profile stringers 60 define a fluid channel 61. The term "open profile stringer configuration" relates to a stringer configuration which does not form an enclosed duct when assembled as part of the fuselage assembly.

Figure 3:
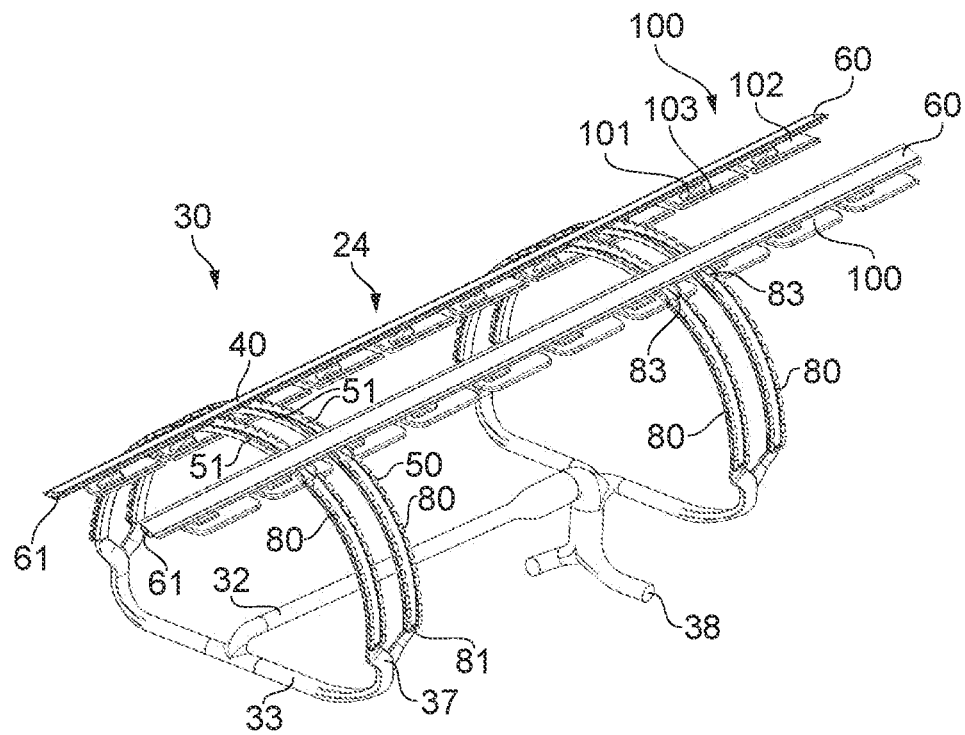
FIG. 3 is a partial cut-away perspective view of the crown region of the fuselage of FIG. 2.
Figure 4:
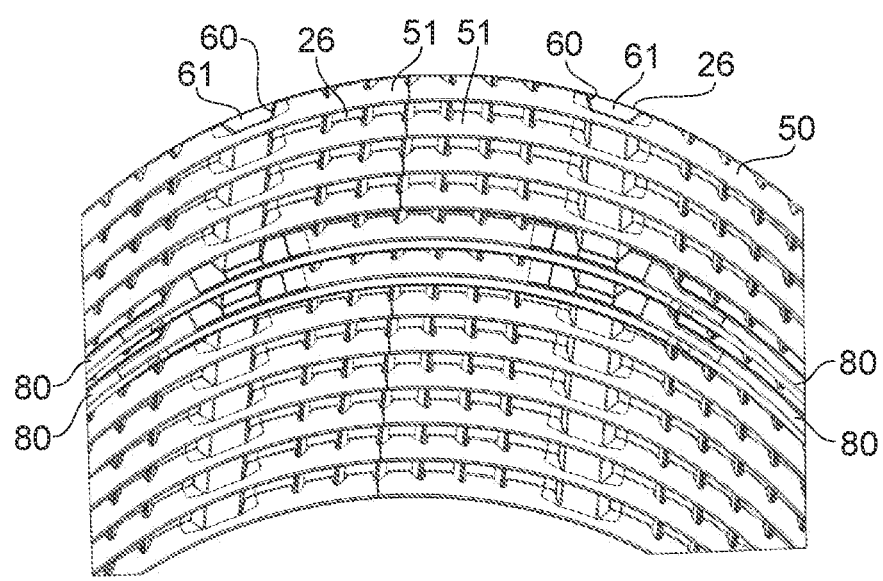
FIG. 4 is a perspective view of part of the cabin air distribution system and a fuselage assembly of the aircraft of FIG. 1.

Referring to FIGS. 3 and 4, the fuselage 20 comprises two closed profile stringers 60 acting as a first type of stringer configuration. The number of closed profile stringers 60 may vary. The closed profile stringers 60 are disposed in a crown region 24 of the fuselage 20. The crown region 24 is defined at the upper end of the fuselage 20. As used herein, upper end of the fuselage relates to the part of the fuselage distal to the ground when the aircraft 10 is in its normal position on the ground.

Figure 5:
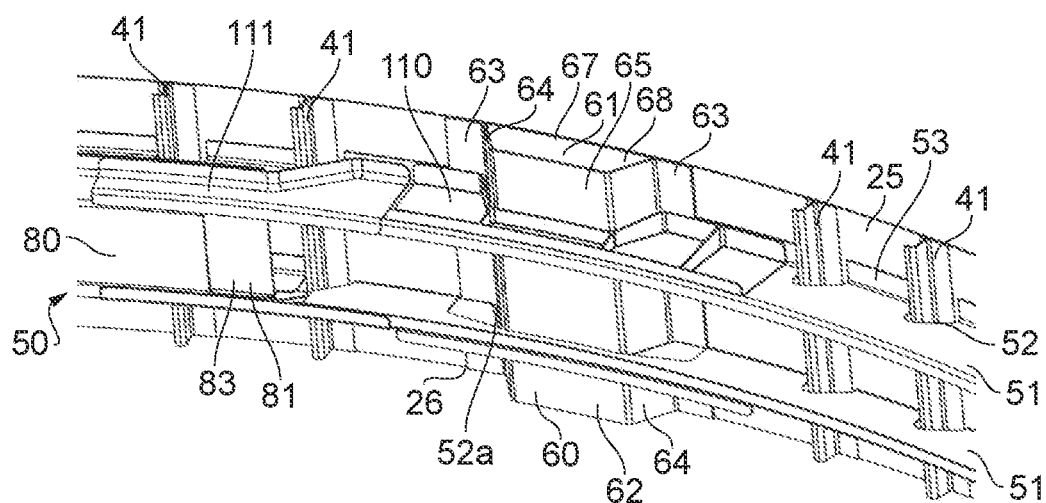
FIG. 5 is a cut-away perspective view of part of the cabin air distribution system and the fuselage assembly of FIG. 3.
Figure 6:
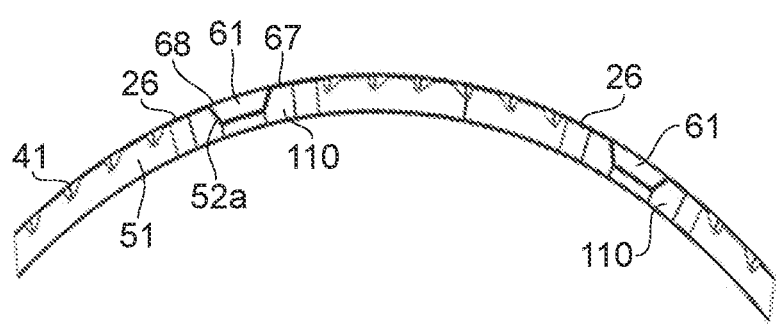
FIG. 6 is a cut-away front view of part of the cabin air distribution system and the fuselage assembly of FIG. 3.

The closed profile stringers 60 extend longitudinally. The closed profile stringers 60 are on the inner side 27 of the fuselage skin 25. Each closed profile stringer 60 extends through the frames 50 in a perpendicular direction. The frames 50 comprise enlarged openings 52a which are configured to receive the closed profile stringers 60. The shape of the enlarged opening 52a conforms to the profile of the closed profile stringers 60. A stiffener 110 is disposed on each frame 50 and extends around the enlarged opening 52 of each frame 50 to provide structural support to the frame 50 in the proximity of the enlarged opening 52a. Enlarged openings 52a are formed in open profile frames 51 extending from the closed profile frame 80, as shown in FIG. 5. Connectors 111 provide a load path between each closed profile frame 80 and each open profile frame 51 extending therefrom. As such a load path is provided around the fuselage 20 from the closed profile frame 80. This provides a continuous load path around the fuselage 20. As such, the closed profile stringers 60 extend through the frames 50.

The fuselage 20 comprises a plurality of open profile stringers 41, acting as a second type of stringer configuration. These further stringers forming a second type of stringer configuration may differ in their configuration. That is, in embodiments the further stringers comprise two or more types of stringer configurations, such as two different open profile stringer configurations. In the embodiment shown in the Figures, the open profile stringers 41 have an open profile stringer configuration of a J-profile shape stringer. This arrangement is clearly shown in FIGS. 5 and 6. The open profile stringer configuration may differ and the plurality of open profile stringers 41 may include one or more of a C, I, J, L and Z-shape profile stringer configuration.

The fuselage 20, comprising a fuselage assembly, includes different types of frame 50 configurations. The fuselage 20 comprises open profile frames 51 and closed profile frames 80. The closed profile frames 80 define a fluid duct 81. The term "open profile frame configuration" relates to a frame configuration which does not form an enclosed duct when assembled as part of the fuselage assembly.

The fuselage 20 comprises closed profile frames 80 acting as a first type of frame configuration. The number of closed profile frames 80 may vary. The closed profile frames 80 may be formed together with open profile frames 51 to form an extended frame arrangement.

The fuselage 20 comprises a plurality of open profile frames 51, acting as a second type of stringer configuration. These further frames 51 forming a second type of frame configuration may differ in their configuration. That is, in some embodiments the further frames comprise two or more types of frame configuration, such as two different open profile frame configurations. In the embodiment shown in the Figures, the open profile frames 51 have an open profile frame configuration of a J-shape profile frame. The open profile frame configuration may differ and the plurality of open profile frames 51 may include one or more of a C, I, J, L and Z-shape profile frame configuration.

The aircraft 10 comprises a cabin environmental control system 29. The cabin environmental control system 29 includes a cabin air distribution system 30. The cabin air distribution 30 distributes air within the cabin 23. The closed profile stringers 60 form part of the cabin air distribution system 30. The closed profile frames 80 form part of the cabin air distribution system 30. Referring to FIGS. 3 to 6, the cabin air distribution system 30 is shown in detail.

The cabin 23 may include two or more air distribution zones, for example a forward zone and a rearward zone (not shown). The cabin air distribution system 30 distributes the air to each of the air distribution zones, however in embodiments the cabin air distribution system 30 may be a dedicated system for one or a limited number of air distribution zones.

The cabin environmental control system 29 includes a mixer unit 31. The cabin air distribution system 30 receives air from the mixer unit 31. The mixer unit 31 receives air from one or more sources, including one or more of bleed air from the engine 12, recirculated air from the cabin 23, and atmospheric ram air received from external to the aircraft. The air received from the one or more air sources is mixed by the mixer unit and supplied to the cabin air distribution system 30 as a cabin air supply 38. The cabin air distribution system 30 includes an air supply arrangement. The air supply arrangement includes a longitudinal supply duct 32 along which air is fed from the cabin air supply 38 and branch supply ducts 33 through which air flowing along the longitudinal supply duct 32 is subsequently fed. The branch supply ducts 33 extend perpendicular to the longitudinal supply duct 32. The supply duct arrangement may differ in configuration.

The cabin air distribution system 30 includes riser ducts 34. In the present arrangement, the cabin air distribution system 30 includes eight riser ducts, although the number of riser ducts may vary. The closed profile frames 80 form the riser ducts 34 as will the described below.

The cabin air distribution system 30 comprises two longitudinal distribution ducts 35, 36. The longitudinal distribution ducts 35, 36 extend in the longitudinal direction of the fuselage 20. The longitudinal distribution ducts 35, 36 are arranged in the crown region 24. The riser ducts 34 fluidly communicate with the longitudinal distribution ducts 35, 36. An upper end of each riser duct 34 is in fluid communication with one of the longitudinal distribution ducts 35, 36. The closed profile stringers 60 form the longitudinal distribution ducts 35, 36 as will be described below.

The cabin air supply 38 provides an air flow from the mixer unit 31 to the cabin air distribution system 30. Air from the cabin air supply 38 is distributed via the longitudinal supply duct 32 and the branch supply ducts 33. Each branch supply duct 33 distributes the air flow to the riser ducts 34. An air divider 37 at an end of each branch supply duct 33 divides the air flow and communicates with two riser ducts 34. Each pair of riser ducts 34 extend parallel to and spaced from each other. In the present arrangement the cabin air distribution system 30 comprises four pairs of riser ducts 34. Four riser ducts 34 extend on one side of the fuselage 20 and four riser ducts 34 extend on an opposing side of the fuselage 20. Each riser duct 34 extends between the branch supply duct 33 and one of the longitudinal distribution ducts 35, 36. The riser ducts 34 extend in a circumferential direction about the inner side 27 of the fuselage 20.

Each closed profile frame 80 forms one of the fluid ducts 81. Each closed profile stringer 60 forms one of the fluid channels 61. The fluid duct 81 of each closed profile frame 80 forming the riser duct 34 is in fluid communication with the fluid channel 61 of the fluid channel 61 of one of the closed profile stringers 60 forming the distribution duct 35, 36. An open upper end 83 of the fluid duct 81 is in fluid communication with an aperture (not shown) formed in the closed profile stringer 60 adjacent to the open upper end 83 of the closed profile frame 80. With such an arrangement, it is possible to maintain the load paths of the closed profile stringers 60 and closed profile frames 80. The fluid duct 81 and fluid channel 61 may be spaced from each other and fluidly connected by a flow path arrangement.

Fluid outlets 100 are disposed along the longitudinal distribution ducts 35, 36. The fluid outlets 100 comprise fluid outlet ports 101 spaced along closed profile stringers 61. The fluid outlet ports 101 communicate with an air distribution unit 102 at each fluid outlet port 101. Each air distribution unit 102 has a vent 103 through which air from the cabin air distribution system 30 is able to flow into the cabin 23. The closed profile stringers 60 forming the distribution ducts 35, 36 are disposed in the crown region 24 and are spaced apart from each other on either side of the crown region 24 such that the first longitudinal distribution duct 35 is on one side of the cabin 23 and second longitudinal distribution duct 36 is on another side of the cabin 23. Such an arrangement is shown in FIG. 3. The frames 50 extend along each side of the fuselage 20 to the crown region 24 and between the two closed profile stringers 60. Each frame 50 forms a continuous load path around the circumference of the fuselage with the frames 50 forming the closed profile frames 80 comprising open profile frame 51 sections, for example between the closed profile stringers 60.

The closed profile stringer 60 comprises an inverted hat profile stringer 62. The inverted hat profile stringer 62 comprises stringer feet 63, stringer webs 64 and a stringer flange 65. The stringer flange 65 extends between the stringer webs 64 which extend transversely from edges of the stringer flange 65. The stringer feet 63 extend from each free end of the stringer web 64. The stringer flange 65 and stringer webs 64 define the fluid channel 61. A panel 26 encloses an open side of the fluid channel 61. The panel 26 defines a closed face 63 of the closed profile stringer 60. The panel 26 comprises an insulation layer 67. The insulation layer 67 helps to regulate the temperature of air flowing along the fluid channel 61. The panel 26 comprises a support layer 68. The support layer 68 provides rigidity to the closed profile stringer 60. The web feet 63 are on the panel 26. The support layer 68 extends between the web feet 63 of the inverted hat profile stringer 62 to provide a structural box configuration. The insulation layer 67 and support layer 68 may define the fuselage skin 25 or may form part of a region of the fuselage skin 25. The closed face 63 of the closed profile stringer 60 may form part of the fuselage skin 25 or may be a panel disposed on the fuselage skin. The inverted hat profile stringer 62 may be bonded to the panel 26, or mounted thereon by fixings, for example.

The arrangement described herein provides for integration of structural and air distribution architecture. As such it is possible to minimise the required space for the cabin air distribution system 30. The number of components is therefore minimised, reducing assembly time and weight. It is also possible to remove the complicated fishbone configuration in the crown region 24 of the fuselage.

By providing a pair of longitudinal distribution ducts in the crown region 24 of the fuselage 20. It is possible to locate one fluid channel to one side of the fuselage and another fluid channel to another side of the fuselage. As such, the ducting required to provide air vents on each side of the cabin 23 is minimised. Air is able to be provided directly to the fluid outlets 100 on each side of the cabin 23 without the need for additional lengths of duct.

By providing a dedicated closed profile frame 80 defining fluid duct 81 and a dedicated closed profile stringer 60 defining fluid channel 61, it is possible to integrate cabin air distribution 30 into the structural arrangement of the fuselage 20 without limiting the load paths of the structural element of the fuselage 20. As such, it is possible to minimise the weight and maximise the reliability of the fuselage 20.

Figure 7:
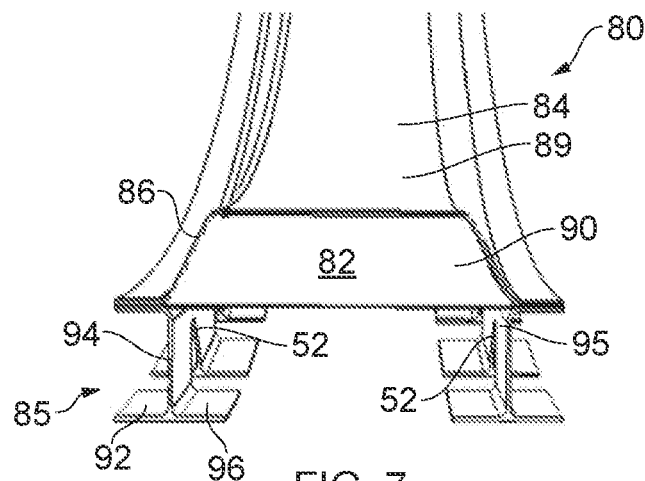
FIG. 7 is a cut-away perspective view of part of the cabin air distribution system and the fuselage assembly of FIG. 3.
Figure 8:
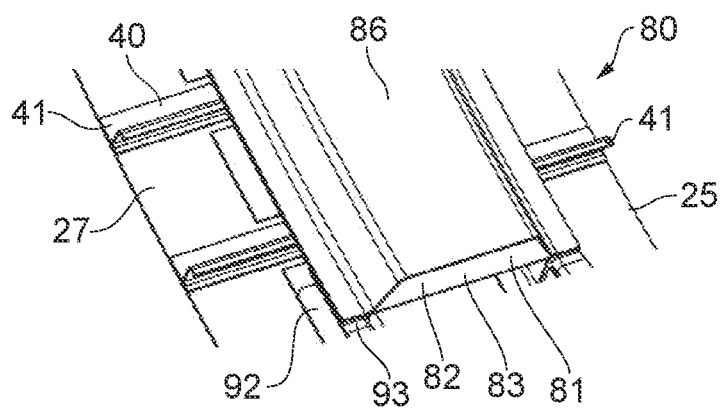
FIG. 8 is another cut-away perspective view of the part of the cabin air distribution system and the fuselage assembly of FIG. 7.
Figure 9:
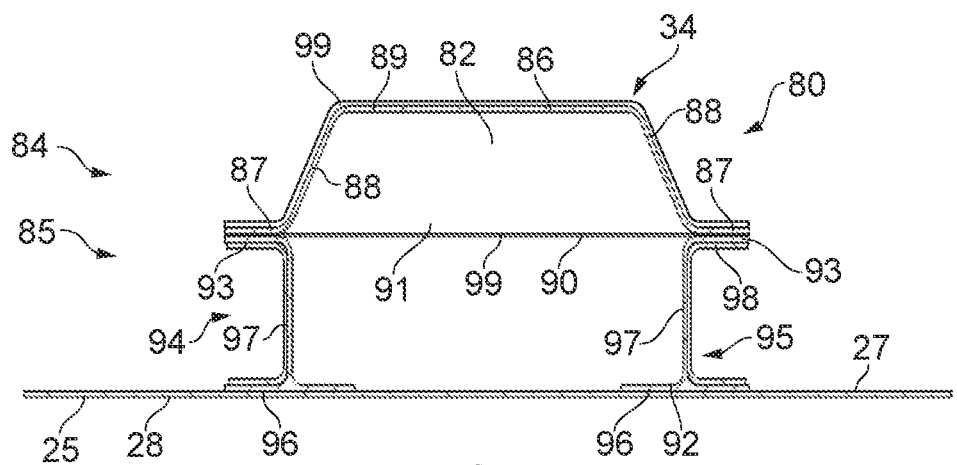
FIG. 9 is a cross-sectional view of the part of the cabin air distribution system and the fuselage assembly of FIG. 7.

Referring to FIGS. 7 to 9, the configuration of the closed profile frames 80 will now be described in detail.

One closed profile frame 80 is shown in each of FIGS. 7 to 9. The closed profile frames 80 extend in a hoop-wise direction as shown in FIGS. 2 and 3. Each closed profile frame 80 forms part of one of the circumferentially extending frame 50 arrangements. As shown in FIG. 2, an open profile frame 51 extends from the lower end of the closed profile frame 80, and extends to another one of the closed profile frames 80 on the other side of the fuselage 20. As shown in FIG. 3, two open profile frames 51 extend between the upper end of each closed profile frame 80 and extend to the upper end of another closed profile frame 80. It is noted that the frame extending between the lower end of each closed profile frame 80 is omitted in FIG. 3. As such, a circumferentially extending load path is formed around the fuselage body 20a.

The closed profile frame 80 comprises the fluid duct 81. The fluid duct 81 is formed by frame channel 82. As such, the closed profile frame 80 forms the riser duct 34. The fluid duct 81 has the upper open end 83 to communicate with the fluid channel 61 of one of the distribution ducts 35, 36. The other end of the fluid duct 81 communicates with the branch supply duct 33 via a divider 37 as shown in FIG. 3. As such, the fluid duct 81 defines an enclosed fluid duct between the upper open end 83 and the opposing lower end.

The closed profile frame 80 comprises an upper part 84 and a lower part 85. The upper part 84 defines the frame channel 82. The lower part 85 extends between the upper part 84 and the fuselage skin 25. The lower part 85 spaces the upper part 84, and therefore the fluid duct 81, from the fuselage skin 25. With such an arrangement, the air passing through the fluid duct 81 is not directly exposed to changes in external atmospheric air temperature through the fuselage skin 25. The spacing of the fluid duct 81 from the fuselage skin 25 provides for stringers 40 to pass through the closed profile frame 80 without intersecting the fluid duct 81. As such, the load path of the stringers 40 is maintained, and the enclosed fluid duct 81 may be maintained. As used herein, upper part and lower part relate to their positioning relative to each other; distal and proximal to the fuselage skin 25 respectively.

The upper part 84 comprises an inverted hat profile section 86. The inverted hat profile section 86 has spaced upper part feet 87 which extend from opposing upper part webs 88. The upper part webs 88 extend transversely from upper part flange 89. The upper part flange 89 and webs 88 define the frame channel 82.

A panel 90 is disposed between the upper part 84 and the lower part 85. The panel 90 encloses an open side 91 of the frame channel 82. The panel 90 extends along the length of the frame channel 82 such that the upper part 84 and the panel 90 form the enclosed fluid duct 81. The panel 90 is planar in cross section and follows the arc of the closed profile frame 80. The panel 90 extends between the upper part feet 87. The panel 90 is rigid and so provides structural support within the closed profile frame 80. Alternatively, the panel 90 is flexible.

The lower part 85 comprises a skin mounting section 92 and an upper part mounting section 93. The skin mounting section 92 is fixed on the inner side 27 of the fuselage skin 25. The skin mounting section 92 is mounted by means of bonding or fixings, for example.

The lower part 85 comprises two profile section structural elements 94, 95. It will be understood that in an alternative embodiment the lower part 84 may comprise a single profile section structural element, for example a hat shaped profile section. The profile section structural elements 94, 95 have a J-shape section profile. It will be understood that the shape of the profile section structural elements may vary. For example, the profile section structural elements may have a C, I or Z-shape profile.

Each profile section structural element 94, 95 comprises a lower part foot 96, a lower part web 97 and a lower part flange 98. The lower part foot 96 acts as the skin mounting section 92. The lower part foot of the J-shape section profile has two opposing portions forming the skin mounting section 92. In embodiments of the profile section structural element, only a single portion is present. The lower part flange 98 acts as the upper part mounting section 93. The upper part feet 97 amounted to each lower part flange of the profile section structural elements 94, 95. The panel 90 is mounted between the lower part flanges 98 and the upper part feet 87. The two profile section structural elements 94, 95 are disposed in a parallel spaced arrangement. The panel 90 and the upper part 84 extends between the two profile section structural elements 94, 95. Each lower part web 97 spaces the skin mounting section 92 formed by the lower part foot 96 from the upper part mounting section 93 formed by the lower part flange 98.

The stringer receiving openings 52 are formed in each of the profile section structural elements 94, 95. The stringer receiving openings 52 extend part way up the height of the profile section structural elements 94, 95 and is spaced from the upper part mounting section 93.

An insulation layer 99 extends around the fluid duct 81. The insulation layer 99 extends along an underside of the panel 90. The insulation layer 99 also extends along an upper side of the upper part 84. As such, the insulation layer 99 encloses the fluid duct 81. By providing the above described configuration, it is possible to provide the insulation layer 99 around the periphery of the fluid duct 81. The insulation layer 99 aids the maintenance of the temperature of the air flowing through the fluid duct 81. The insulation layer 99 may be integrated with the panel 90.

The upper part 84, lower part 85 and panel 90 are assembled by bonding or fixings, for example. The upper part 84 is sealed with the panel 90 to provide a fluid seal to the fluid duct 81.

With the above configuration it is possible to provide an enclosed fluid duct 81 as part of the structural assembly of the fuselage, and so form the riser duct 34 as an integrated part of the structural assembly of the fuselage 20. This means that it is possible to eliminate the need for separate ducting assembly and so the weight of the fuselage 20 may be minimised. With such an arrangement, it is possible to form a fluid duct in the frame 50 without weakening the load path of the frames 50.

Where the word 'or' appears this is to be construed to mean 'and/or' such that items referred to are not necessarily mutually exclusive and may be used in any appropriate combination.

Although the invention has been described above with reference to one or more embodiments, it will be appreciated that various changes or modifications may be made without departing from the scope of the invention as defined in the appended claims.

The invention claimed is:

1. A frame for an aircraft fuselage, the frame comprising:
a fluid duct, and
a skin mounting section configured to mount to a skin of the aircraft fuselage, wherein the fluid duct is spaced from the skin mounting section
an upper part including a frame channel partially defining the fluid duct;
a lower part separate from the upper part and forming the skin mounting section, wherein the lower part is disposed between the skin of the fuselage and the fluid duct, and
a panel separate from the upper part and the lower part, sandwiched between the upper part and the lower part, and attached to an open side of the frame channel to form the fluid duct.

2. The frame of claim 1, wherein the lower part includes parallel spaced profile section structural elements, and the upper part extends between the parallel spaced profile section structural elements.

3. A cabin air distribution system comprising the frame of claim 1.

4. An aircraft fuselage assembly comprising: an aircraft fuselage; and the cabin air distribution system of claim 3, wherein the skin mounting section is mounted to a skin of the aircraft fuselage.

5. The frame of claim 1, wherein the upper part has spaced upper part feet which extend from opposing upper part webs, and the upper part webs extend from an upper part flange, wherein the upper part flange and webs define a frame channel, wherein the feet attach to the panel.

6. The frame of claim 5, wherein the upper part comprises an inverted hat profile section.

7. The frame of claim 1, wherein the lower part comprises a lower part foot, a lower part web and a lower part flange.

8. The frame of claim 1, wherein the lower part comprises at least one profile section structural element.

9. The frame of claim 8, wherein each profile section structural element comprises a lower part foot, a lower part web and a lower part flange.

10. The frame of claim 8, wherein the at least one profile section structural element has a C, I, J, Z or hat-shaped profile.

11. The frame of claim 8, wherein the lower part of the frame comprises two parallel spaced profile section structural elements, and the upper part extends between the two parallel spaced profile section structural elements.

12. The frame of claim 1, further comprising an insulation layer extending around the duct.

13. The frame of claim 1, wherein the frame extends in a hoop-wise arrangement.

14. The frame of claim 1, wherein the lower part comprises a stringer receiving opening configured to receive a stringer extending transverse to the frame.

15. The frame of claim 14, wherein the stringer receiving opening is independent from the fluid duct.

16. An aircraft fuselage assembly comprising: an aircraft fuselage; and the frame of claim 1, wherein the skin mounting section is mounted to a skin of the aircraft fuselage.

17. A frame for an aircraft fuselage, the frame comprising:
a fluid duct, and
a skin mounting section configured to mount to a skin of the aircraft fuselage,
wherein the fluid duct is spaced from the skin mounting section,
further comprising an upper part forming the fluid duct and a lower part forming the skin mounting section, wherein the lower part is disposed between the skin of the fuselage and the fluid duct,
wherein the upper part has spaced upper part feet which extend from opposing upper part webs, and the upper part webs extend from an upper part flange, wherein the upper part flange and webs define a frame channel, and wherein the upper part comprises an inverted hat profile section.

18. A frame for an aircraft fuselage, the frame comprising:
a first lower part and a separate and parallel second lower part each extending circumferentially around at least a portion of the aircraft fuselage, wherein the first lower part and the second lower part each include lower part feet configured to attached to a skin of the aircraft fuselage, a web extended from the lower part feet and including notches between adjacent ones of the lower part feet and aligned with stringers on the skin, and a lower part flange on a side of the web opposite to the lower part feet; and
an upper part frame channel extending circumferentially around at least a portion of the aircraft fuselage, the upper part frame defining at least a portion of a fluid duct in the upper frame channel, and the upper part frame channel includes a first upper part foot and a second upper part foot on opposite sides of the fluid duct, wherein the first upper part foot is connected to the flange of the first lower part and the second upper part foot is connected to the flange of the second lower part.

19. The frame of claim 18, further comprising a panel spanning between the first upper part foot and the second upper part foot, wherein the panel is sandwiched between the first upper part foot and the flange of the first lower part and between the second upper part foot and the flange of the second lower part, and the panel with the upper part frame defines the fluid channel.

\* \* \* \* \*